United States Patent
Wakeman

[15] 3,645,751
[45] Feb. 29, 1972

[54] PREPARING CHEESE CURD

[72] Inventor: Alden H. Wakeman, Lake Mills, Wis.
[73] Assignee: Wisconsin Alumni Research Foundation, Madison, Wis.
[22] Filed: Jan. 20, 1971
[21] Appl. No.: 108,012

Related U.S. Application Data

[63] Continuation-in-part of Ser. No. 754,823, Aug. 23, 1968, abandoned.

[52] U.S. Cl....................................................99/116, 31/89
[51] Int. Cl.............................................................A23c 19/02
[58] Field of Search...................99/115, 116, 243; 31/46, 89

[56] References Cited

UNITED STATES PATENTS

| | | | |
|---|---|---|---|
| 3,298,836 | 1/1967 | Ernstrom | 99/116 |
| 3,465,439 | 9/1969 | Wakeman et al. | 99/116 X |

OTHER PUBLICATIONS

Hanrahan, et al., New Type Pasteurizing, Deodorizing, and Concentrating Equipment for Use in Cheese Manufacture. J. Dairy Science Vol. 42, 1959 (p. 907) SF 221J8.

*Primary Examiner*—A. Louis Monacell
*Assistant Examiner*—D. M. Naff
*Attorney*—Howard W. Bremer

[57] ABSTRACT

A continuous process for preparing cheese curd from milk which includes the sequential steps of (a) deaerating the milk, (b) cooling the deaerated milk, (c) adding acid to the cooled milk in a manner which provides substantially instantaneous acidification of the milk but which avoids localized overacidification, (d) immediately heating the acidified milk by passing it through heat exchange means to coagulate the curd-forming elements in the milk and form curd, (e) periodically momentarily reversing the flow of the coagulating milk during passage through the heat exchange means, (f) cutting the formed curd as it emerges from the heat exchange means, (g) cooking the cut curd, (h) cooling the cooked curd, (i) draining the whey from the curd and (j) washing the curd.

6 Claims, 6 Drawing Figures

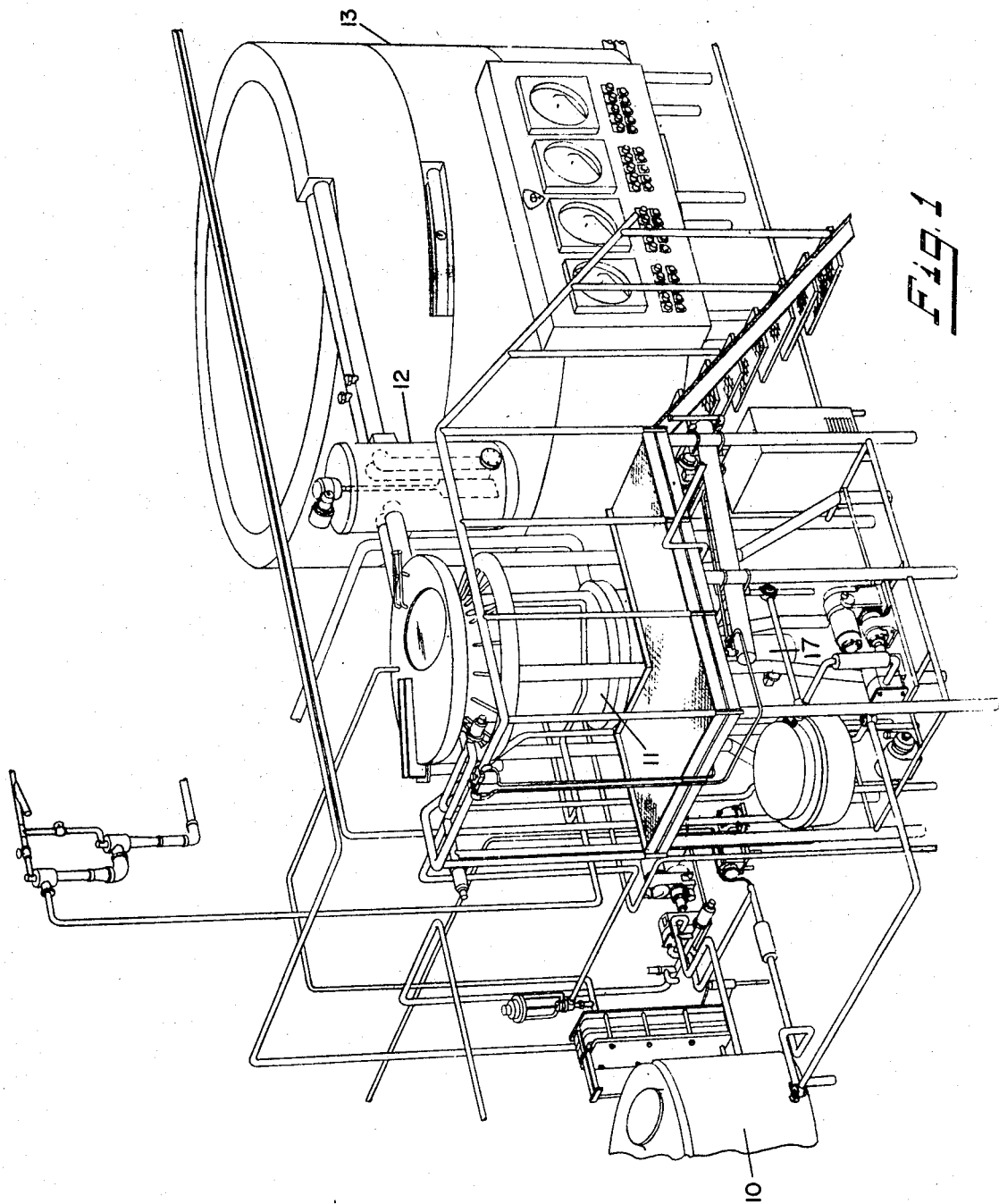

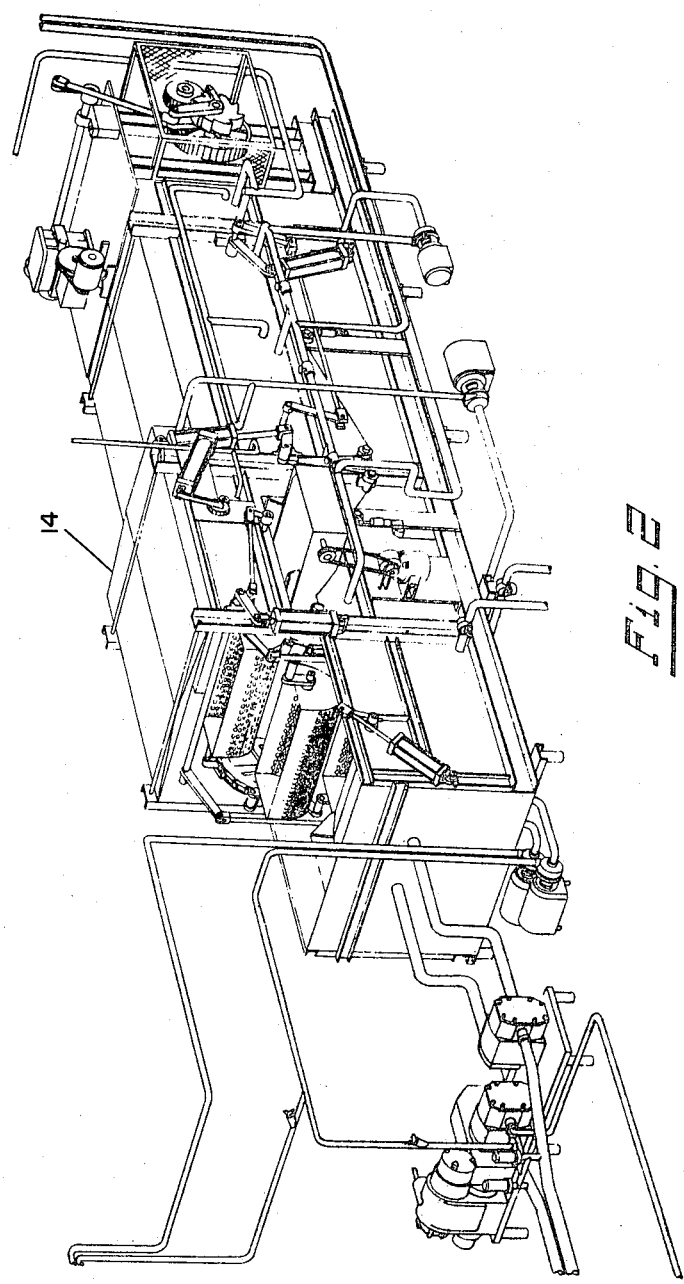

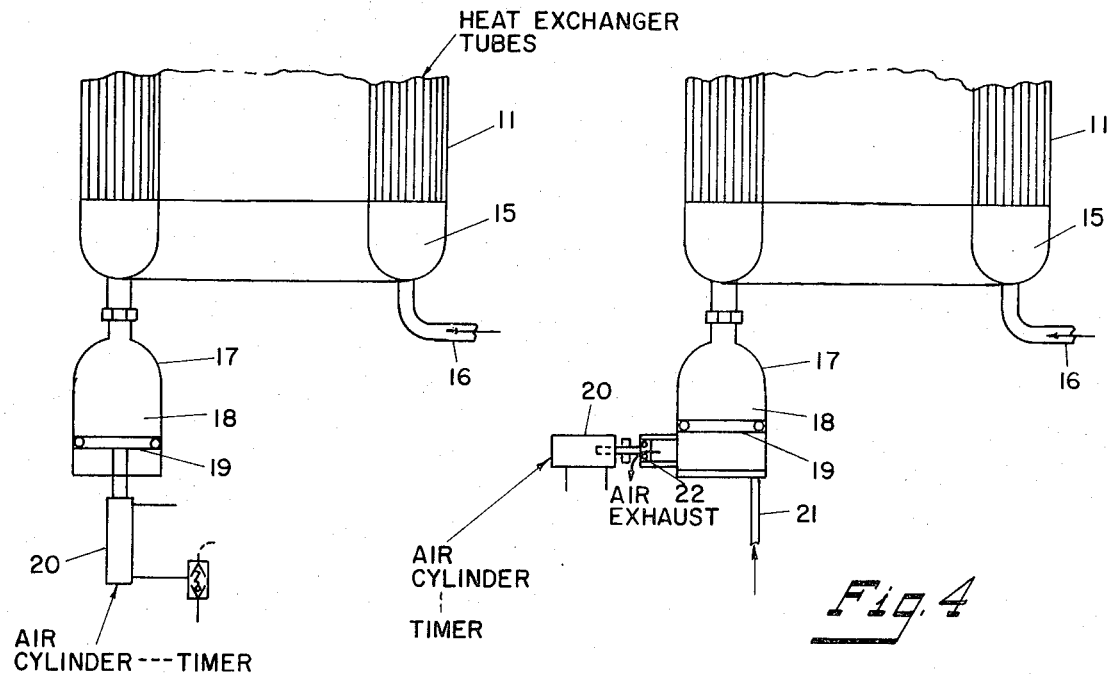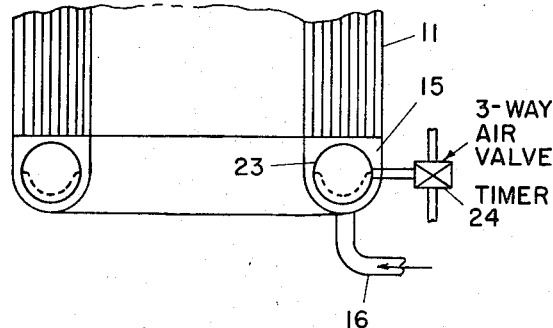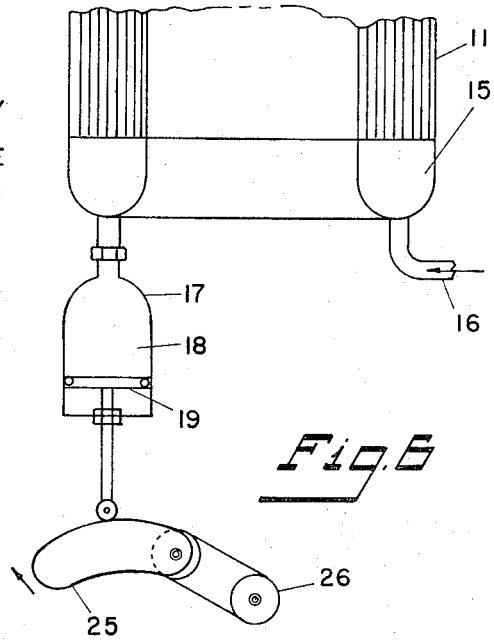

PREPARING CHEESE CURD

This application is a continuation-in-part of application Ser. No. 754,823, filed Aug. 23, 1968 now abandoned.

This invention relates to an improved method for making cheese curd. More particularly, this invention relates to an improved method for making cheese curd on a continuous basis. Still more particularly, this invention relates to an improved method for making cheese curd on a continuous basis wherein a water-soluble food-processing grade acid is utilized to adjust the pH of the milk to within the isoelectric range of the casein present in the milk.

As a matter of convenience the following discussion will be directed to the application of the method of this invention in the making of cottage cheese curd. It is to be understood, however, that the method also finds ready application in the preparation of curd adaptable for use in the manufacture of other cheese products.

Cottage cheese is conventionally made from skim milk by the addition of a starter culture which contains acid-producing organisms, e.g., Streptococcus lactis or Streptococcus cremoris. The acid produced in situ in the milk by the organism drops the pH and causes coagulation of the milk into a smooth firm gel from which the cottage cheese curd is made.

Various improvements upon this method of making cottage cheese have been suggested. See, for example, Ernstrom U.S. Letters Pat. Nos. 3,089,776 and 3,298,836 which are directed to processes including the use of a food grade acid, such as hydrochloric, to induce coagulation of curd forming elements in the milk. The process of U.S. Pat. No. 3,298,836 is of particular interest since the present invention comprises certain improvements in the continuous process disclosed and claimed in that patent.

It has been found that although the process of U.S. Pat. No. 3,298,836 is eminently suitable for the production of cottage cheese from milk having a high nonfat milk solids content, the use of low solids milk, e.g., skim milk containing about 9 percent nonfat milk solids, generated certain operational difficulties. Also, the curd produced by the process of that patent was not consistently uniform in size or texture or in its ability to adsorb the creaming mixtures conventionally applied to dry cottage cheese curd.

The present invention provides a process for producing cheese curd from milk without limitation on the solids content of the milk and without the disadvantages attendant upon earlier processes. Most importantly, this invention provides a process for producing cheese curd from milk on a continuous basis over an extended period of time.

This invention resides in a process for treating milk to produce curd which comprises a series of sequentially practiced steps including: deaerating the milk; cooling the deaerated milk; adding acid to the cooled milk so as to substantially acidify the milk to the desired pH without localized overacidification; immediately heating the acidified milk by passage through heat exchange means to coagulate the curd-forming element in the milk and form curd; periodically momentarily reversing the flow of the stream of coagulating and coagulated milk during passage through the tubes of the heat exchange means whereby a reverse shear action between the coagulum and the walls of the heat exchange tubes is created and sticking of the coagulum to the said walls is thereby prevented; cutting the curd emerging from the tubes of the heat exchange means; cooking the cut curd; cooling the cooked curd; draining the whey from the curd; and washing the curd.

If the ends of this invention are to be realized, i.e., if continuous curd production over an extended period of time is to be achieved with concomitant consistency in curd size, texture, and creaming characteristics, careful attention must be given to four of the steps in the above process. In all cases the practice of these four steps is essential to the achievement of the desired results. The four essential steps in the order in which they occur in the process as set forth are:

1. deaeration of the milk to be processed;
2. substantially instantaneous acidification of the milk with a food grade acid without localized overacidification;
3. a periodical momentary reversal of the flow of the coagulating milk during passage through the tubes of the heat exchanger;
4. cooking the curd at a temperature in the range from about 170° to 184° F. The other steps of the process as outlined can be carried out in accordance with the practices and under the conditions conventional in the art and particularly as set forth in U.S. Letters Pat. No. 3,298,836.

It is to be understood that the cooking temperature range specified in step (4) above is essential to the making of cottage cheese curd having the desired characteristics. This cooking temperature range will be different if the process of this invention is to be used for preparing cheese curd other than cottage cheese curd and in such circumstances may not comprise an essential element in the process. Thus, and depending upon the particular type of cheese curd being prepared, an appropriate cooking temperature can comport with known practices in the art or can readily be determined by means of a preliminary trial. For example, in the preparation of cheddar cheese curd the cooking temperature must be controlled so that the desirable organisms present in the curd and which are essential to the later curing process are not destroyed. It is also to be appreciated that the equilibrium pH of the acidified milk will vary depending upon the particular cheese curd being prepared.

In its entirety, and as practiced in the manufacture of cottage cheese utilizing in part the apparatus of U.S. Letters Pat. No. 3,465,439, issued Sept. 9, 1969, in the name of A. H. Wakeman, D. C. Roahen and R. L. Knox, the process of this invention comprises:

1. substantially completely deaerating a stream of milk containing from about 8 to about 40 percent nonfat milk solids;
2. cooling the stream of milk to a temperature in the range from about 35°–50° F.
3. continuously adding to the stream of cooled milk and mixing intimately therewith, a water-soluble, food-processing grade acid, e.g., hydrochloric acid, in an amount sufficient to acidify the milk to an equilibrium pH in the range from about 4.5 to about 4.7 when at a temperature of about 70° F., under conditions which substantially avoid any local overacidification and which provide substantially instantaneous acidification of the milk stream;
4. substantially immediately following the acidification, heating the stream of acidified milk to a temperature in the range from about 90° to about 125° F. by passing the stream in nonturbulent flow and in the substantial absence of interparticle motion through heat exchange means whereby the acidified milk is coagulated and the resulting curd is set;
5. periodically and momentarily reversing the flow of the coagulating and coagulated stream of acidified milk during passage through the tubes of the heat exchange means whereby a reverse shear action between the coagulum and the walls of the said tubes is created and sticking of the coagulum to the said walls is prevented;
6. cutting the curd into substantially uniform segments as it emerges from the heat exchange means;
7. cooking the cutc8 curd by passage of the cut curd and whey through heat exchange means wherein the temperature of the curd and whey is raised to from about 170° to about 184° F.;
8. cooling the curd and whey to a temperature below about 145° F.;
9. draining the whey from the curd; and
10. washing the curd.

FIGS. 1 and 2 taken together are representative of apparatus in which the process of this invention can be readily practiced.

FIGS. 3, 4, 5, and 6 are representative of apparatus which is suitable to periodically momentarily reverse the flow of the coagulating and coagulated stream of milk in the heat exchanger in which the curd in formed, In the application of the present process for the manufacture of cottage cheese, for example, and referring to the drawings, 10 represents a storage tank for holding a supply of acidified milk for use in the process. Prior to placement in tank 10 the milk must be deaerated, and acidified—essential steps in this process.

In traditional cottage cheese making procedures little difficulty is encountered in obtaining a suitable curd as a result of the incorporation of air in the curd since during the normal quiescent hold period in the vat before and while gelation is taking place air has time to escape. In continuous processes, however, where curd formation takes place in a very short period of time incorporation of air can adversely affect the curd texture and, as a consequence, acceptability of the curd in the market. Although in such continuous processes incorporation of air sufficient to make the curd float is generally not encountered, it has been found that air actually dissolved in the milk is at least in part retained in the curd as it forms and imparts to the curd a microscopically spongy structure. Such structure is not considered desirable since it affects the texture and "feel" of the curd when chewed.

To avoid such undesirable spongy structure the milk must be deaerated and, after deaeration, processed through curd formation in a closed system to prevent to the greatest possible extent any reabsorption or mixing in of air.

Such deaeration can be accomplished by conventional means well-known in the art and which employ heat treatment under vacuum. (See, for example, *Modern Dairy Products* by Lampert (1965) Chemical Publishing Co., New York, N.Y., page 176 for a typical piece of apparatus used for such a purpose.)

Following deaeration the milk is cooled, preferably to a temperature in the range from about 35° to 50° F. and is then acidified with a water-soluble food-processing grade acid. The acid is added in an amount sufficient to produce an equilibrium pH in the milk of from about 4.5 to about 4.7 when at a temperature of about 70° F. The acid must be added and intimately mixed with the milk in a manner which will provide substantially instantaneous acidification of the milk, thereby preventing localized overacidification and precoagulation. Appropriate mixing can be accomplished by a number of means, but on a continuous flow basis it has been found that the desired rapid acidification can be obtained by impinging upon each other converging streams of milk and dilute acid. The violent mixing action obtained by this means effects substantially instantaneous acidification. It has been found that such acidification improves curd tension when the curd is later formed resulting in a curd which resists fragmentation when mechanically handled and since precoagulation is avoided, all of the coagulation to curd is later accomplished in a quiescent state providing curd characterized by greater uniformity of size.

Following acidification it is preferable to begin heating of the acidified milk as soon as possible and thereby effect coagulation. Consequently, the amount of time the acidified milk is held in tank 10 should be kept to a minimum and it may even be preferable to bypass tank 10 and move the milk in a continuous stream from deaeration to acidification to coagulation.

Coagulation of the acidified milk is carried out in heat exchange means 11, termed herein the "curd former." Basically, the curd former comprises vertically arranged tubes through which the acidified milk flows in an upward direction. The tubes are surrounded by a jacket within which a heating fluid is circulated and which heats the vertically disposed tubes. (A curd former of this type is more fully described in U.S. Letters Pat. No. 3,465,439 referred to above.) Tubes of relatively small diameter are used in the heat exchange means to permit the formation of the curd without turbulence, i.e., without interparticle motion, in the upwardly flowing acidified milk stream. As the acidified milk contacts the heated tube wall it coagulates immediately adjacent the heated wall. Upon coagulation some whey is expelled between the coagulum and the wall to form a thin layer of liquid which then functions as a lubricant between the wall and the formed coagulum, allowing the formed coagulum (curd) to slip easily through the tube. As the acidified milk progresses from the inlet end to the outlet end of the tube coagulation of the acidified milk progresses from the portion nearest the tube wall inwardly toward the center of the tube as heat is conducted toward the center of the moving stream. Thus, the coagulum contrives to form a sleeve around the still liquid center portion of the coagulating milk as it progresses through the heat exchange tube. The speed with which the acidified milk is forced through the tube and the temperature of the heating medium in the surrounding jacket are controlled so that the milk is completely coagulated by the time it reaches the outlet end of the tube, from which the coagulum emerges in rodlike form and is cut to the desired length. It has been found that heating of cool acidified milk product in the curd former to a temperature of about 90° to 125° F. is adequate to induce formation of the desired coagulum.

Certain difficulties have been encountered with such continuous curd-forming procedure in that the formed coagulum does not always flow smoothly through the heat exchanger tubes. At times, because of localized overheating perhaps, or for whatever reason, the coagulum sticks to the sides of the tube impeding flow through the tube and at worst completely plugging the tube. With the flow impeded by sticking curd, the passage time through the tube increases, which means the coagulum is exposed for a greater length of time to the heated tube walls. This tends to create a type of case hardening on the rodlike curd and adversely affects the curd characteristics.

One of the features of the process of this invention prevents the sticking of the coagulum in the heat exchanger tube and thereby not only increases curd consistency but makes possible extended continuous operation on a practical and practicable basis since shutdown necessitated by clogged tubes is virtually eliminated. This feature comprises periodically and momentarily reversing the flow of the stream of coagulated and coagulating acidified milk in the heat exchanger tubes of the curd former. In general, this reversal of flow can be accomplished by providing means whereby in a given interval of time the imput of acidified milk into the heat exchanger tubes from the tube header of the curd former is less than the output of curd from the tubes. Various means for achieving this end are depicted in FIGS. 3, 4, 5 and 6 in which like numbered parts designate identical elements.

Referring to FIG. 3, 11 designates in broken section the bottom portion of the curd former of FIG. 1. Also 15 designates the tube header of the curd former and 16 the acidified milk inlet to the header. Furthermore 17 is a schematic showing of a volumetric displacement device comprising a chamber 18 and a piston 19 within the chamber. The piston 19 is connected by a suitable rod to the piston in an air cylinder 20 which functions to extend and retract the piston within the chamber 18 in a timed sequence through connection with a timing device which controls the flow of air to one side or the other of the piston in air cylinder 20 as is well known in the art.

In operation the volumetric displacement device of FIG. 3 functions as follows to periodically and momentarily reverse the flow of coagulating and coagulated acidified milk in the heat exchanger tubes. Milk, cooled and acidified, is pumped into header 15 at a constant rate by means of a positive displacement pump, filling the header and flowing up through the heat exchanger tubes where the coagulum is formed as set forth hereinbefore. From a fully extended position within the chamber 18 the piston 19 is very rapidly retracted by operation of the air cylinder 20. This rapid retraction of the said piston immediately increases the total combined volume of the header 15 and the chamber 18 so that such combined volume is greater than the volume of acidified milk flowing into the header at that time interval. Since the curd former is shown mounted vertically this rapid increase in the combined volume of the header and chamber causes the milk and coagulum in the tubes of the curd former to momentarily reverse in flow, by the effect of gravity, in an attempt to fill the chamber and header. This sudden reversal of flow tends to create a reverse shear action between the tube wall and the formed coagulum within the heat exchanger tubes and prevents the coagulum from sticking to the walls thereby eliminating the disadvantages associated with such sticking, i.e., overheating of the coagulum and the undesirable hard curd resulting from such overheating and plugging of the tubes with coagulum. The piston 19 is then slowly returned to its fully extended position through operation of the air cylinder 20 so that only a rapid reversal of flow is obtained and no forward surge of milk and coagulum occurs in the tubes of the curd former.

Although in the foregoing description and in the drawings the curd former is shown in a vertical position and the volumetric device utilizes the force of gravity in performing its function, a horizontal arrangement of the curd former and/or of the volumetric displacement apparatus is equally operable.

FIG. 4 is a schematic diagram of an apparatus which basically functions as does the apparatus of FIG. 3 to periodically and momentarily reverse the flow of the milk and coagulum in the curd former. In the apparatus shown, however, the air is continuously fed through line 21 to the underside of piston 19, which in this embodiment is a floating piston and the rapid retraction of the piston is realized by the opening of a large exhaust port, shown at 22, through action of the air cylinder 20 on a timed basis. Rapid exhaustion of the air under the floating piston through port 22 allows the static head on piston 19 to quickly force the piston to the bottom of chamber 18 thereby rapidly increasing the combined volume of the chamber and header to greater than the volume of acidified milk flowing into the header at that time interval and resulting in the effect described above with reference to FIG. 3.

Other methods of accomplishing the flow reversal are shown in FIGS. 5 and 6. FIG. 5 shows a rubber tube 23 placed within a header the inflation and deflation of which changes the volume of the header. The dotted lines indicate the position of the tube when deflated. The inflation and deflation of the tube are accomplished through the timed action of a three-way air valve 24, which allows a very rapid deflation to cause a sudden enlargement of the volume of the header and a slow inflation so that only a rapid reversal of flow is obtained and no forward surge of milk and coagulum occurs in the tubes of the curd former.

In FIG. 6 the movement of the piston, rapid retraction and slow extension, is obtained through rotation of the dropoff cam 25 which through linkage with motor 26, which has a variable speed drive, permits flexibility in the timed sequence over which piston 19 is extended and retracted, the retraction and extension of the piston providing the periodic and momentary reversal of flow as explained above in relation to the apparatus of FIGS. 3 and 4.

The position of the volumetric displacement device of the type shown in FIG. 3 with respect to the curd former is shown at 17 in FIG. 1.

The flow reversal in the curd former should be made to occur on a periodic basis and hence in the illustrations of FIGS. 3, 4, 5 and 6 the flow reversal mechanism is indicated as being linked to a timing mechanism. The rate of repetition of flow reversal is not critical but in all cases should be such as will prevent the sticking of the coagulum to the tube walls. It is expected that this repetition rate may vary depending upon the type of cheese curd which is being made but such rate can be readily adjusted through adjustment of the timing mechanism linked to the flow reversal mechanism and the need for adjustment to prevent sticking can be readily determined from visual observation.

As the curd emerges in rodlike form from the tubes of the curd former along with whey it is cut into short lengths by a rotating knife arrangement at the top of the curd former, is cooled by mixing with whey which has been previously cooled, and is passed to surge tank 12 and from there to the cooker 13. The cooker is conveniently comprised of three stacked sections, each of which is susceptible of individual and separate temperature control so that the curd and whey moves successively through three heating or cooling zones. A more complete description of the cooker can be found in U.S. Letters Pat. No. 3,465,439 referred to supra.

In the process of this invention, and utilizing the cooker (processor) of U.S. Letters Pat. No. to 3,465,439, the curd and whey is maintained at a temperature of about 80° to about 100° F. in the first zone of the cooker. This temperature is not critical but is maintained so that the curd and whey is not suddenly exposed to the higher cooking temperatures in the second zone of the cooker.

An essential feature of the process of this invention is the cooking temperature to which the curd and whey is exposed in the second zone of the cooker. In order to obtain the desired in characteristics it has been found that this temperature must be maintained in the range from about 170° to about 184° F. and that the curds and whey must reach a temperature within this range. The residence time of the curds and whey in the various sections of the processor will vary depending upon the flow rate through the processor. The essential factor in obtaining cheese curd having the desired characteristics is that the curds and whey reach a temperature within the specified range and not the length of time they are maintained at such temperature. If the curds and whey do not reach a temperature of about 170° a mushy curd which does not have the desired firmness will result, while if a temperature in excess of about 184° F. is reached the formation of a highly undesirable gelatinous product tends to occur.

In the third zone of the cooker the curd and whey is cooled to at least about 145° F. and if desired, to the temperature of the first wash water applied i the conditioner 14, i.e., to about 90° to 100° F. Cooling to at least about 145° F. is essential to prevent the cooked curd from sticking together.

In normal operations in the preparation of cottage cheese curd the flow rate of the curds and whey through the cooker (processor) is regulated so that the residence time in each of the three zones of the cooker is about 6 to 7 minutes.

From the cooker the cooled curd and whey is delivered to the conditioner 14 where the curd and whey are separated and the separated curd is repeatedly washed with progressively cooler water, as is more fully described in U.S. Letters Pat. No. 3,465,439 supra, to avoid thermal shock to the curd. Also, the final wash water may be acidified to adjust the acidity of the curd (see U.S. Pat. No. 3,298,836, column 5, lines 17–25).

As in the process of U.S. Pat. No. 3,298,836, the hydrochloric acid utilized for acidifying the milk in the aforedescribed process can be replaced by other inorganic or mineral acids, such as phosphoric acid, or by organic acids such as acetic or lactic acid or by any equivalent water-soluble acid which does not leave toxic residues when washed from the curd. Also, while the process eliminates the need for acid-forming bacteria, it will be understood that rennet in various amounts can be used, or flavor imparting agents commonly used in this art, e.g., starter distillate, lactic acid, citric acid, can be employed if desired.

Having thus described this invention, what is claimed is:

1. A continuous process for preparing cheese curd which comprises:
   a. substantially completely deaerating a stream of milk containing from about 8 to about 40 percent nonfat milk solids;
   b. cooling said stream of milk to a temperature in the range from about 35°–50° F.;
   c. substantially instantaneously acidifying the milk with a water-soluble, food-processing grade acid under conditions which substantially avoid any local overacidification;
   d. substantially immediately following said acidification, heating the said stream of acidified milk to a temperature in the range from about 90° to about 125° F. by passage of the said stream in nonturbulent flow and in the substantial absence of interparticle motion through heat exchange means whereby the acidified milk is coagulated and the resulting curd is set;

e. periodically and momentarily reversing the flow of said coagulating and coagulated stream of acidified milk within said meat exchange means during said heating and curd formation whereby a reverse shear action between the coagulum and the walls of the heat exchange means is created and sticking of the coagulum to the said walls is thereby prevented;

f. cutting the set curd as it emerges from said heat exchange means;

g. cooking the cut curd;

h. cooling the cooked curd; and i. washing the curd.

2. A continuous process for preparing cottage cheese curd which comprises:

a. substantially completely deaerating a stream of milk containing from about 8 to about 40 percent nonfat milk solids;

b. cooling said stream of milk to a temperature in the range from about 35°–50° F.;

c. continuously adding to said stream of cooled milk and mixing intimately therewith, a water-soluble, food-processing grade acid in an amount sufficient to acidify the milk to an equilibrium pH in the range from about 4.5 to about 4.7 when at a temperature of about 70° F., under conditions which substantially avoid any local overacidification and which provide substantially instantaneous acidification of the said milk stream;

d. substantially immediately following said acidification, heating the said stream of acidified milk to a temperature in the range from about 90° to about 125° F. by passage of the said stream in nonturbulent flow and in the substantial absence of interparticle motion through heat exchange means whereby the acidified milk is coagulated and the resulting curd is set;

e. periodically and momentarily reversing the flow of said coagulating and coagulated stream of acidified milk within said heat exchange means during said heating and curd formation, whereby a reverse shear action between the coagulum and the walls of the heat exchange means is created and sticking of the coagulum to the said walls is thereby prevented;

f. cutting the set curd as it emerges from said heat exchange means;

g. cooking the cut curd by passage of the said cut curd and whey through heat exchange means wherein the temperature of the curds and whey is raised to from about 170° to about 184° F.;

i. draining the whey from the curd, and j. washing the curd.

3. The process of claim 2 wherein the food-processing grade acid is selected from the group consisting of hydrochloric acid, phosphoric acid, lactic acid and acetic acid.

4. The process of claim 3 wherein the food-processing grade acid is hydrochloric acid.

5. The process of claim 4 wherein the milk is whole milk.

6. The process of claim 4 wherein the milk is skim milk containing about 9 percent nonfat milk solids.

* * * * *